US012433806B2

(12) United States Patent
Heuerman et al.

(10) Patent No.: US 12,433,806 B2
(45) Date of Patent: Oct. 7, 2025

(54) PATIENT ROTATION DEVICE

(71) Applicant: The Patient Company, LLC, Grand Rapids, MI (US)

(72) Inventors: Andrew Heuerman, Scottsdale, AZ (US); Ryan Peters, Traverse City, MI (US); John Farris, Grand Rapids, MI (US); Tyler Boeve, Grandville, MI (US); Taylor Davis, Clarkston, MI (US); Crystal Kinney, Spring Lake, MI (US); Bibek Banjaday, Butwal (NP); Travis Smith, Clarkston, MI (US)

(73) Assignee: The Patient Company, LLC, Grand Rapids, MI (US)

( * ) Notice: Subject to any disclaimer, the term of this patent is extended or adjusted under 35 U.S.C. 154(b) by 147 days.

(21) Appl. No.: 18/389,190

(22) Filed: Nov. 13, 2023

(65) Prior Publication Data

US 2024/0156657 A1 May 16, 2024

Related U.S. Application Data

(60) Provisional application No. 63/424,936, filed on Nov. 13, 2022.

(51) Int. Cl.
*A61G 7/00* (2006.01)

(52) U.S. Cl.
CPC .................................... *A61G 7/001* (2013.01)

(58) Field of Classification Search
None
See application file for complete search history.

(56) References Cited

U.S. PATENT DOCUMENTS

| | | | | |
|---|---|---|---|---|
| 6,065,162 | A * | 5/2000 | Behr | A61G 7/1046 5/81.1 R |
| 6,378,148 | B1 * | 4/2002 | Votel | A61G 7/1044 5/81.1 R |
| 6,496,991 | B1 * | 12/2002 | Votel | A61G 7/1046 5/81.1 R |
| 7,337,477 | B2 * | 3/2008 | Scordato | A61G 7/1046 5/81.1 R |
| 7,434,278 | B2 * | 10/2008 | White | A61G 7/001 5/81.1 R |
| 7,571,498 | B2 * | 8/2009 | Jewell | A61G 7/1046 5/81.1 R |
| 8,156,582 | B2 * | 4/2012 | Rupar | A61G 7/1032 5/81.1 R |
| 11,324,650 | B2 * | 5/2022 | Zhou | A61G 7/1032 |
| 12,109,159 | B2 * | 10/2024 | Cagner | A61G 7/1026 |

(Continued)

*Primary Examiner* — Adam C Ortiz
(74) *Attorney, Agent, or Firm* — The Watson IP Group; Jovan N. Jovanovic

(57) ABSTRACT

A patient rotation device including an armature and a patient engagement assembly. The armature is structurally configured for attachment to an outside structure. The armature has a first end and a second end spaced apart from the first end. The patient engagement assembly includes a housing and a rotational assembly. The housing is attachable proximate the second end of the armature. The rotational assembly includes an axle and a rotational member. The rotational member is rotationally coupled to one of the housing and the armature, and structurally configured to be being positionable over a surface of a bed. Methods are also disclosed.

18 Claims, 8 Drawing Sheets

(56) References Cited

U.S. PATENT DOCUMENTS

| | | | | |
|---|---|---|---|---|
| 2005/0150045 | A1* | 7/2005 | Lloyd | A61G 7/1026 5/81.1 R |
| 2006/0090258 | A1* | 5/2006 | Stryker | A61G 7/1026 5/81.1 R |
| 2020/0100970 | A1* | 4/2020 | DiGiovanni | A61G 7/1026 |

* cited by examiner

PATIENT ROTATION DEVICE

CROSS-REFERENCE TO RELATED APPLICATION

This application claims priority from U.S. Patent App. Ser. No. 63/424,936 filed Nov. 13, 2022, entitled "Patient Rotation Device", the entire specification of which is hereby incorporated by reference in its entirety.

BACKGROUND OF THE DISCLOSURE

1. Field of the Disclosure

The disclosure relates in general to patient moving devices to facilitate the moving of a patient on, for example, a hospital bed, a bed, a stretcher or other similar structure, and more particularly, to a patient rotation device that facilitates the rotation (and/or pronation) of the user upon one of such structures.

2. Background Art

The movement of patients that are confined to beds or the like has become a source of injury to both the patient and the caregiver. It is often quite difficult even for multiple caregivers to manipulate a patient that is confined to a bed (i.e., a hospital bed, or similar structure). Certain solutions have been provided that improve movement of a patient from one bed to another bed, such as, for example, U.S. Patent App. Pub. No. 2020/0100970 published to DiGiovanni et al, the entire disclosure of which is hereby incorporated by reference. Other solutions have likewise been developed, including, for example, U.S. Pat. No. 9,320,667 issued to Tilk et al, U.S. Pat. No. 7,725,964 issued to Minning et al, U.S. Pat. No. 7,571,498 issued to Jewell et al., U.S. Pat. No. 7,458,113 issued to Milam, U.S. Pat. No. 7,434,278 issued to White et al, U.S. Pat. No. 6,834,402 issued to Hanson et al., each one of which is hereby incorporated by reference in its entirety.

There remains a need to improve patient rotation while positioned on a bed or similar structure. That is, it is often the case that a need exists to turn a patient from, for example, lying on their back, to lying on their side, among other orientations.

SUMMARY OF THE DISCLOSURE

The disclosure is directed to a patient rotation device comprising an armature and a patient engagement assembly. The armature is structurally configured for attachment to an outside structure. The armature has a first end and a second end spaced apart from the first end. The patient engagement assembly includes a housing and a rotational assembly. The housing is attachable proximate the second end of the armature. The rotational assembly includes an axle and a rotational member. The rotational member is rotationally coupled to one of the housing and the armature, and structurally configured to be being positionable over a surface of a bed.

In some configurations, the armature includes a bed abutment member positioned proximate the second end of the armature. The bed abutment is structurally configured to abuttingly engage the side of the bed.

In some configurations, the housing of the patient engagement assembly further includes a base having a first end plate at a first side thereof, and a second end plate opposite the first end plate. The end plates are positioned on either side of the armature, with the rotational member spanning therebetween.

In some configurations, the axle interfaces with the first end plate on a first side and the second end plate on a second side.

In some configurations, the base is structurally configured to be positionable one the bed.

In some configurations, the rotational member extends substantially perpendicularly relative to the armature, with the armature being positioned between the first and second ends thereof.

In some configurations, the rotational member comprises a cylindrical member having a diameter. In some configurations, the diameter is approximately 6 inches.

In some configurations, the cylindrical member includes a substantially uniform configuration along the length thereof.

In another aspect of the disclosure, the disclosure is directed to a combination patient slider device and patient rotation device. The patient slider device comprises a frame having a base and an elongated body extending therefrom, and, a patient pulling assembly comprising a winding strap structurally configured to be attachable to a bed sheet positionable over a surface of a bed. The patient rotation device comprises an armature and a patient engagement assembly. The armature is attached to the patient slider device. The armature has a first end and a second end spaced apart from the first end. The patient engagement assembly includes a housing and a rotational assembly. The housing is attachable proximate the second end of the armature. The rotational assembly includes an axle and a rotational member. The rotational member is rotationally coupled to one of the housing and the armature, and structurally configured to be being positionable over the surface of the bed.

In some configurations the armature extends from the elongated body of the patient slider device.

In some configurations, the armature is substantially perpendicular to the elongated body.

In some configurations, the rotational member rotates about the axle, with the axle being perpendicular to the elongated body.

In some configurations, the elongated body is positionable so as to be substantially parallel to the surface of the bed.

In yet another aspect of the disclosure, the disclosure is directed to a method of rotating a patient positioned on a surface of a bed, and having a sheet positioned between the surface of the bed and the patient. The method comprises the steps of: providing a patient rotation device; moving the rotational member of the patient rotation device so as to be positioned over the surface of the bed; directing the sheet across the rotational member; pulling the sheet across the rotational member until the patient reaches the rotational member; rotatably engaging the rotational member with the patient through the sheet; and rotating the patient through continued pulling of the sheet over the rotational member.

In some configurations, the patient is positioned so as to be substantially parallel to the rotational member.

In some configurations, the method includes the step of providing a patient slider device, wherein the patient rotation device is coupled to the patient slider device.

In some such configurations, the method further includes the step of attaching a winching strap to the sheet, the patient slider device having the winching strap extending therefrom. In such a configuration, the step of pulling further comprises the step of pulling the winching strap. Additionally, the step of rotating comprises the continued pulling of the sheet by the winching strap.

BRIEF DESCRIPTION OF THE DRAWINGS

The disclosure will now be described with reference to the drawings wherein.

DETAILED DESCRIPTION OF THE DISCLOSURE

Figure 1:
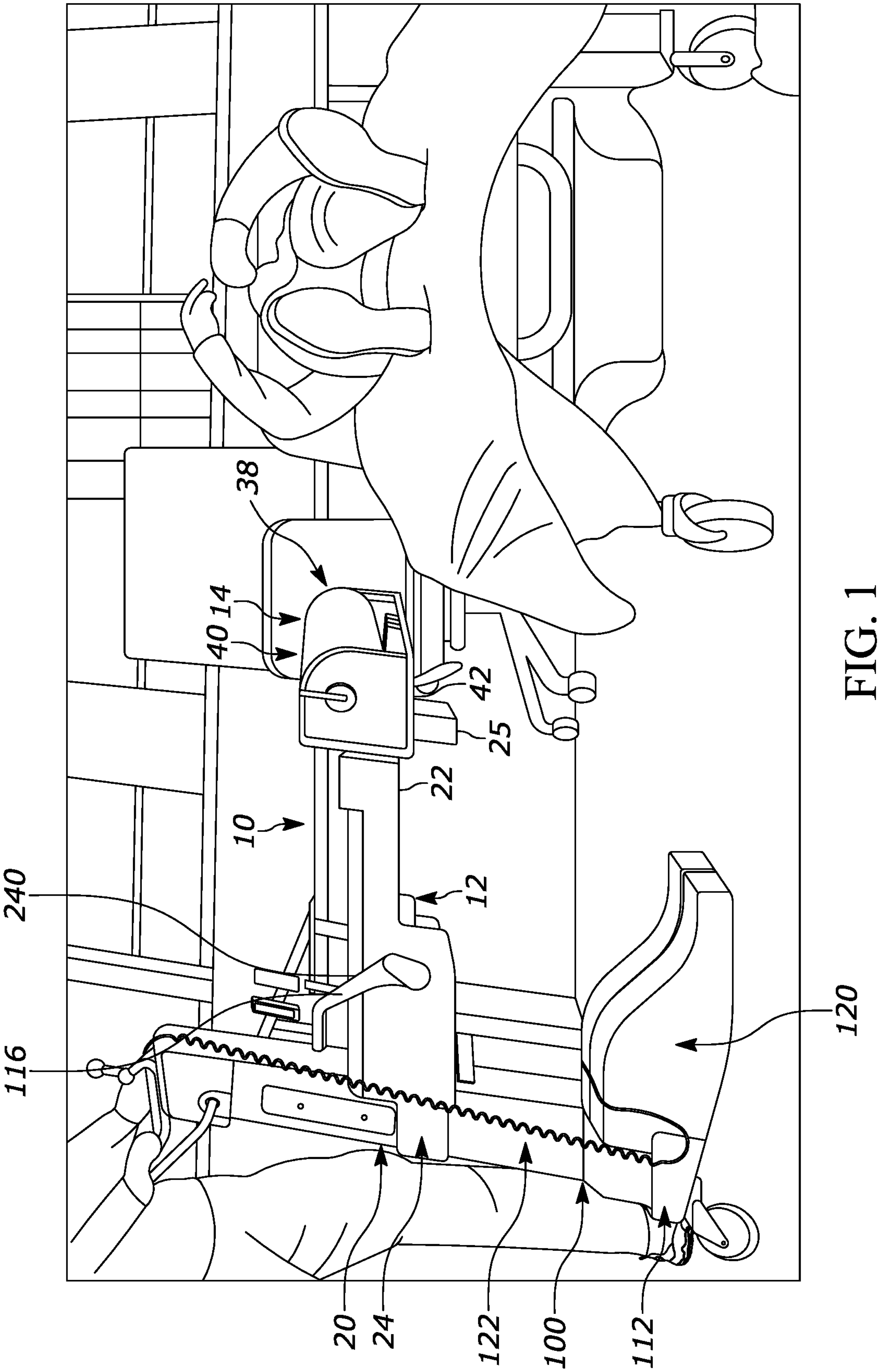
FIG. 1 of the drawings is an image of the patient rotation device coupled to a patient slider device in preparation for use to rotate a patient that is positioned on a bed.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
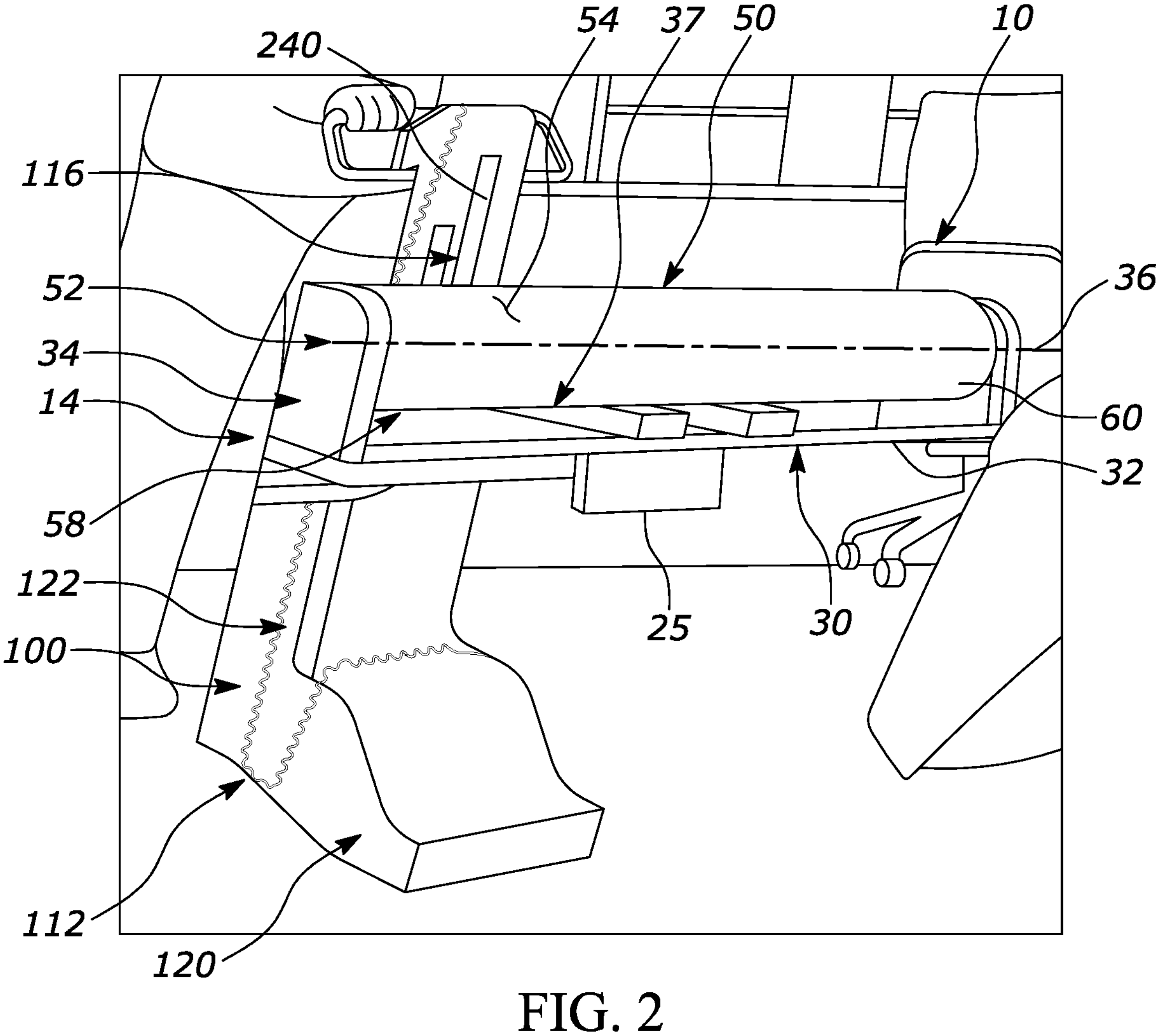
FIG. 2 of the drawings is an image showing a perspective view of the patient rotation device coupled to a patient slider device.
Figure 3:
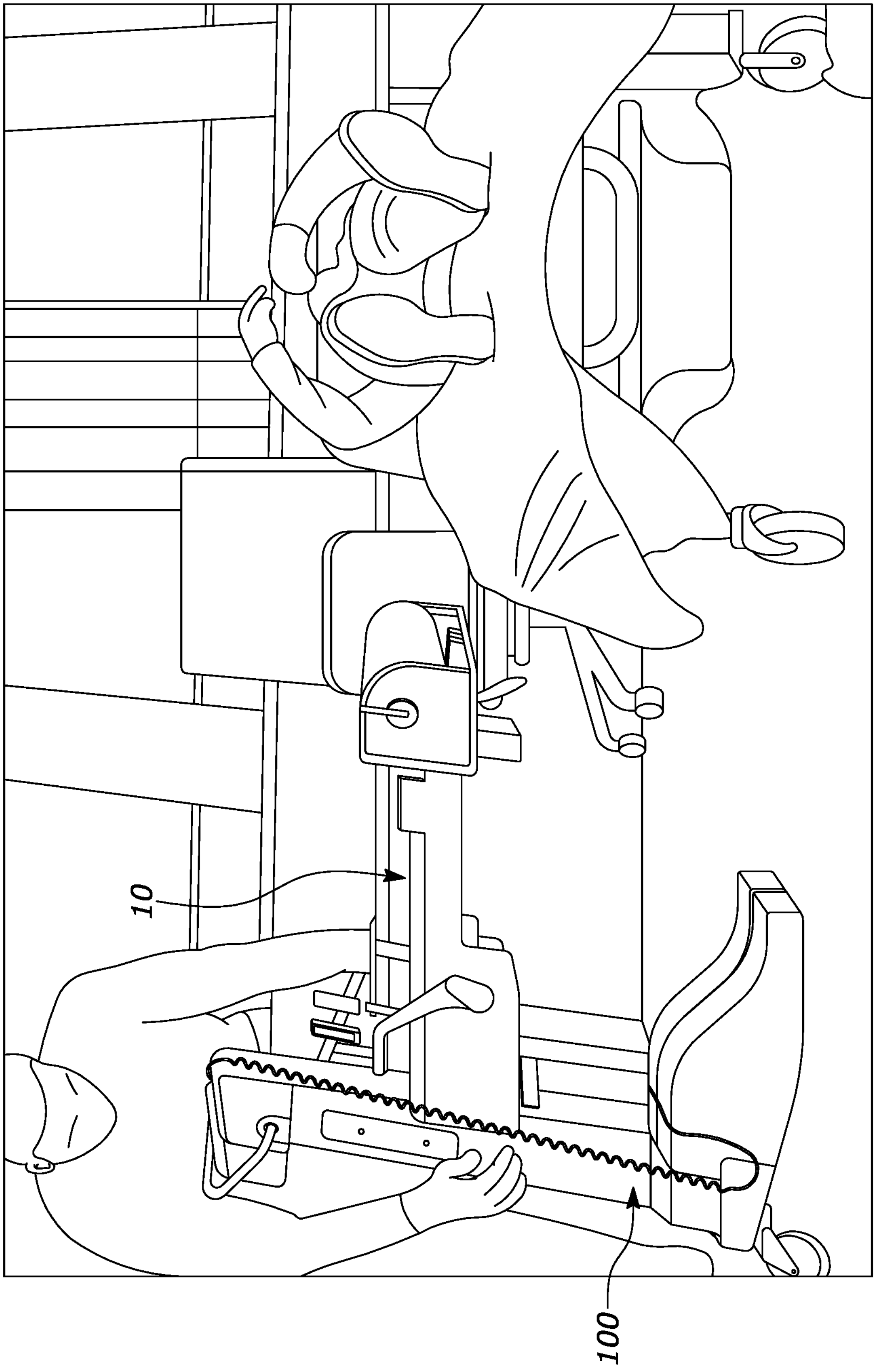
FIG. 3 of the drawings is an image of the patient rotation device coupled to a patient slider device in preparation for use to rotate a patient that is positioned on a bed, showing the position of the rotational assembly on the surface of the bed proximate the patient.
Figure 4:
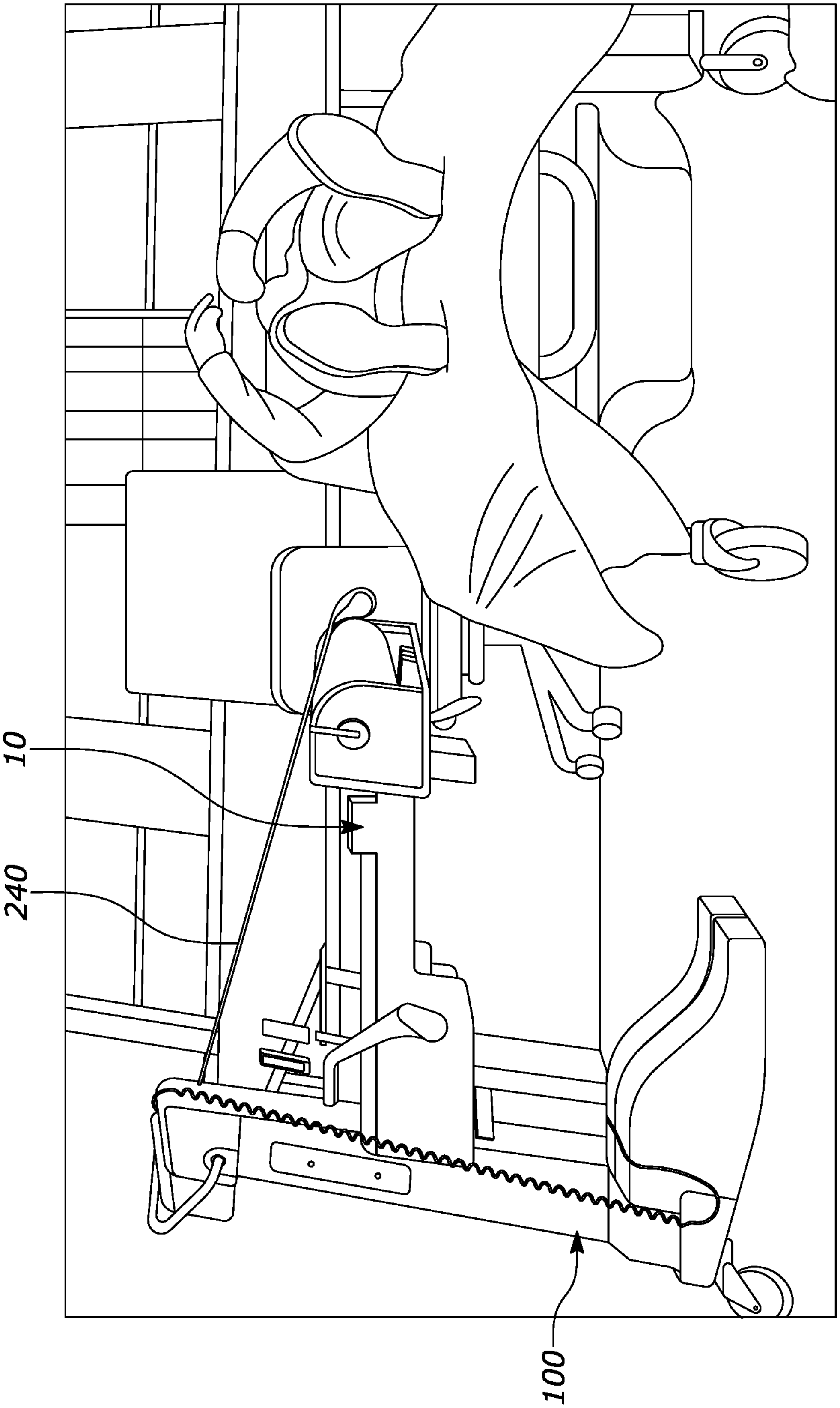
FIG. 4 of the drawings is an image of the patient rotation device coupled to a patient slider device in preparation for use to rotate a patient that is positioned on a bed, showing the winding strap coupled to the sheet with the winding strap initiating retractive movement toward the patient slider device.
Figure 5:
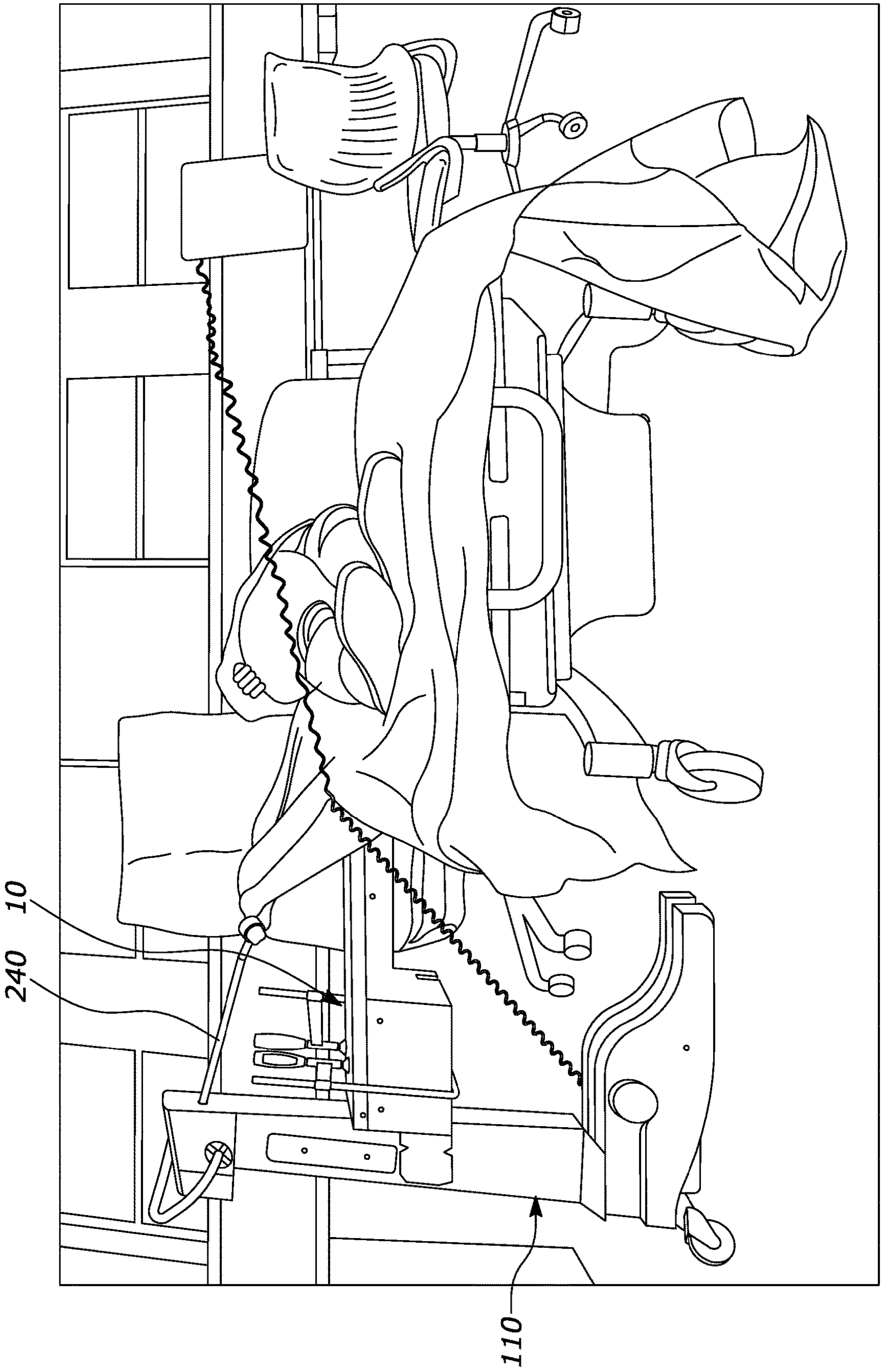
FIG. 5 of the drawings is an image of the patient rotation device coupled to a patient slider device in preparation for use to rotate a patient that is positioned on a bed showing rotation of the patient as the patient engages with the rotational assembly due to the continued retraction toward the patient slider device.
Figure 6:
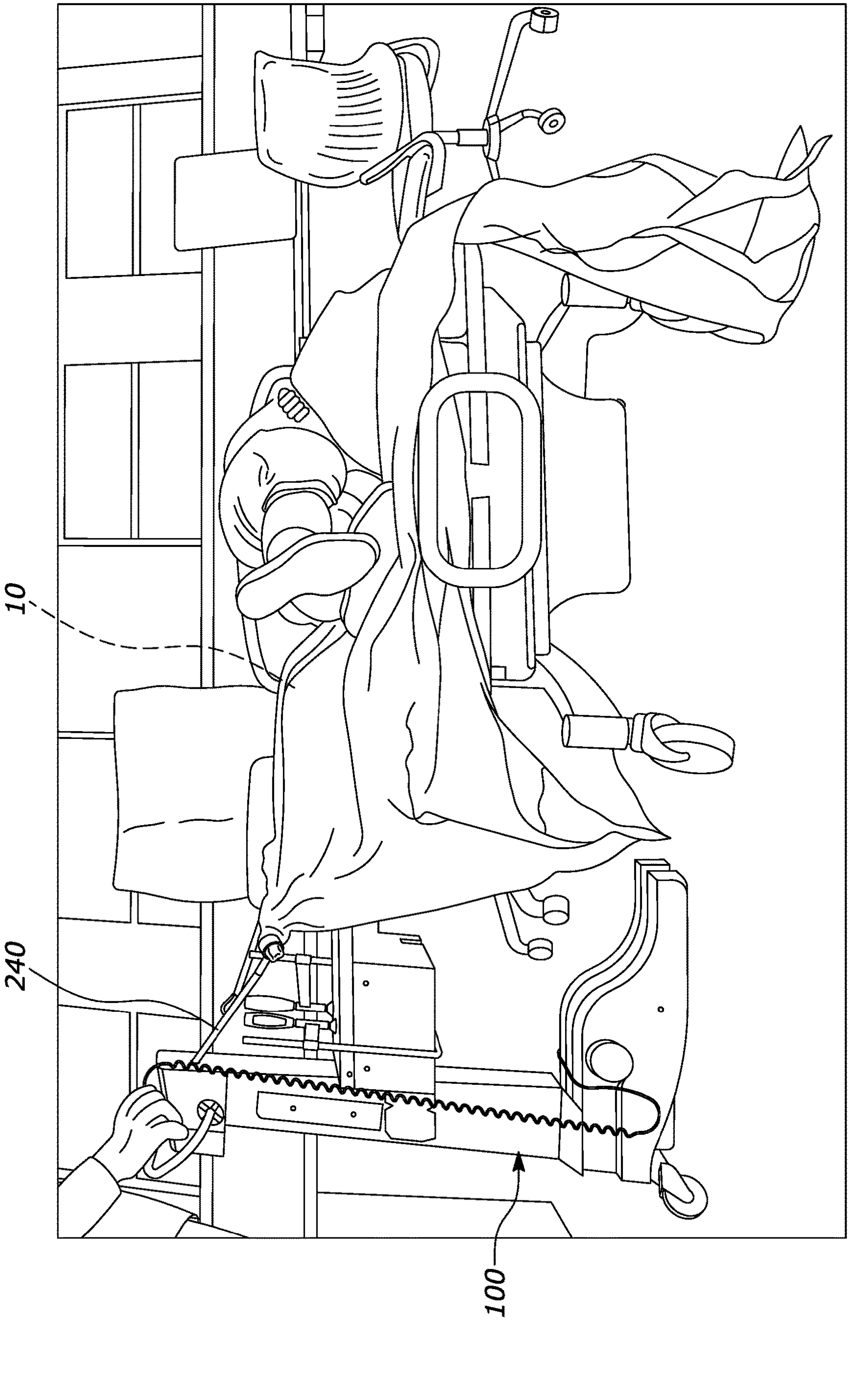
FIG. 6 of the drawings is an image of the patient rotation device coupled to a patient slider device in preparation for use to rotate a patient that is positioned on a bed after rotation, and securement via an inclined pillow/stopper opposing the patient slider device and the patient rotation device, whereupon the two devices may be uncoupled from the sheet and the bed.
Figure 7:
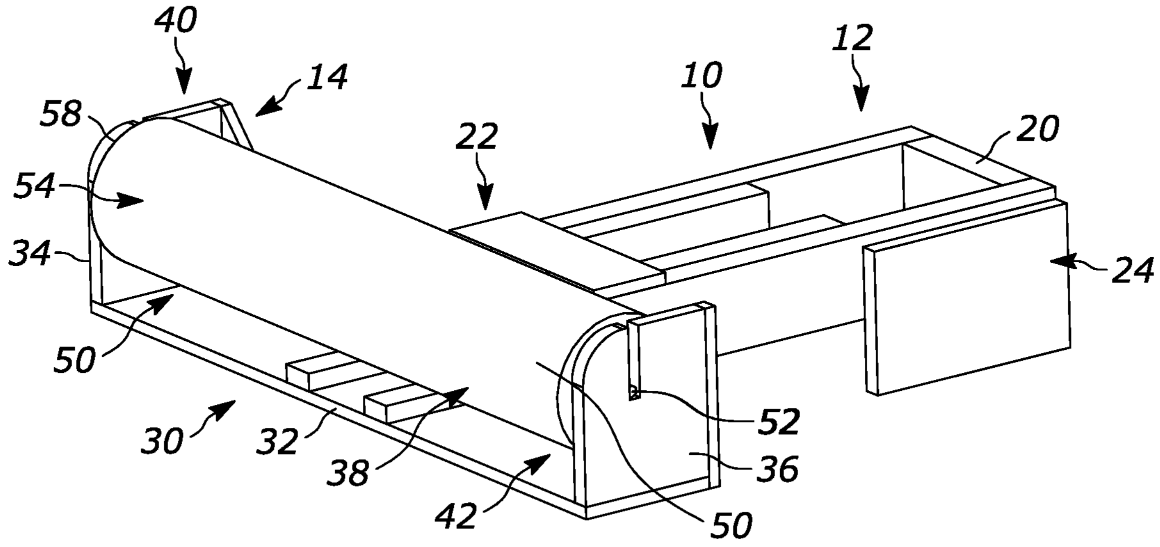
FIG. 7 of the drawings is a front perspective view of a configuration patient rotation device of the present disclosure.
Figure 8:
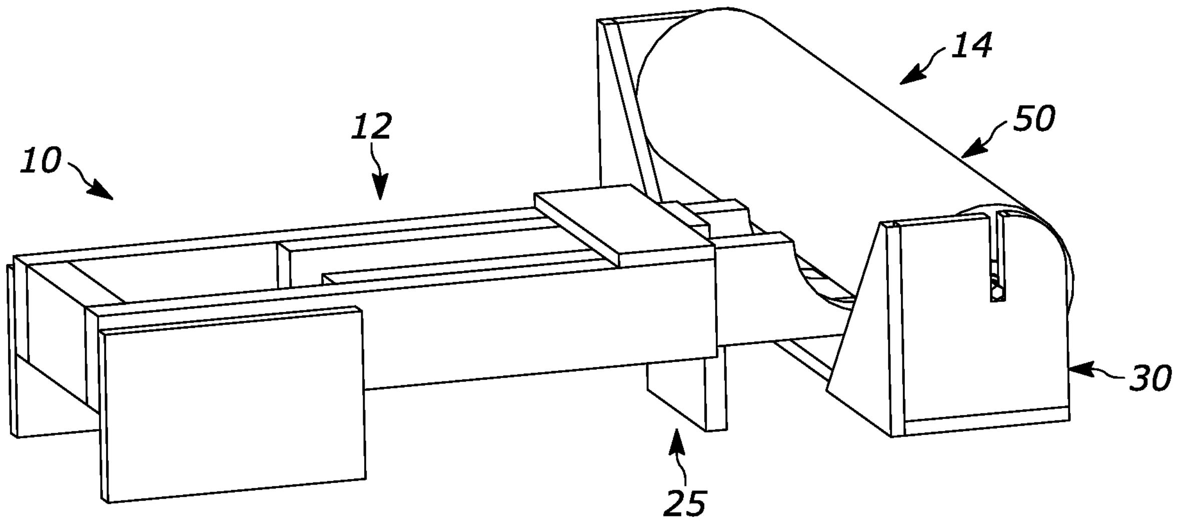
FIG. 8 of the drawings is a back perspective view of a configuration patient rotation device of the present disclosure.
Figure 9:
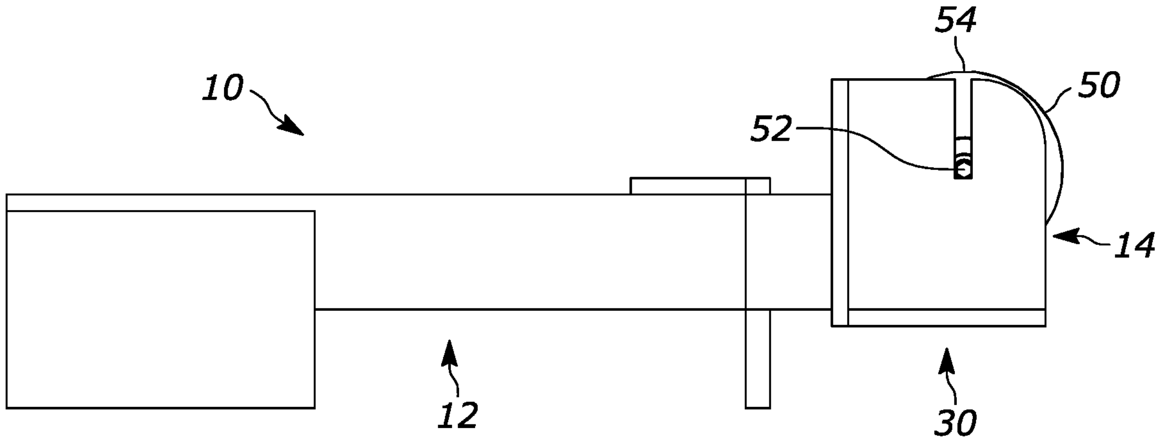
FIG. 9 of the drawings is a side elevational view of a configuration patient rotation device of the present disclosure.

Referring now to the drawings and in particular to FIGS. 1 through 10, the patient rotation device is shown generally at 10. The device 10 is shown as being connected to a patient slider device, such as patient slider device 100. Such a device typically includes a frame 112, and a patient pulling assembly 116. In the configuration of the patient slider device 100, the frame 112 includes base 120, elongated body 122 that extends from the base 112 in a generally upward direction. The patient pulling assembly 116 typically includes a winch assembly having a winding strap 240. The winding strap has an end which is configured to directly or indirectly (through additional components) engage a sheet or other structure which can be placed under a patient and which can support the patient thereon.

While the patient slider device 100 is shown as comprising the device that is shown in the incorporated by reference '970 publication, it will be understood that any number of other patient moving devices, including, but not limited to those identified herein, and incorporated by reference, may be utilized as well in association with the patient rotation device 10.

The patient rotation device 10 includes armature 12, and patient engagement assembly 14. The armature 12 includes first end 20 and second end 22. The first end includes a coupling 24 which is structurally configured to attach to the frame (directly or indirectly) of the patient slider device 100. Additionally, a bed abutment 25 may likewise be provided toward the second end thereof. In the configuration shown, the armature extends from the elongated body at a height that is just above the height of the bed which includes the patient.

In some configurations, it will be understood that the patient rotation device may be provided without an armature. In such configurations, the patient engagement assembly may be directly coupled to an outside structure, a wall or other part of a building, directly to the bed or components of the bed or similar structure. For example, such direct coupling may be through fasteners, hooks screws, rope or any other configurations. It is also contemplated that the patient rotation device may be such that a patient engagement assembly, or a very short armature may be mounted to a bumper (i.e., shorter than the armature shown in the figures, for example).

The patient engagement assembly 14 includes housing 30 and rotational assembly 50. The patient engagement assembly is positioned at the second end of the 22 of the armature 12. The housing 30 of the patient engagement assembly comprises base 32, first end plate 34 and second end plate 36. The housing defines a roller 37 cavity with a front facing opening 38, an upper facing opening 40 and a lower region 42. In the configuration shown, the housing 30 is generally perpendicular to the armature, and the armature generally bisects the housing into substantially equal portions. Of course, other configurations are contemplated, where the two are oblique to each other, for example, among other configurations.

The rotational assembly 50 is shown as comprising axle 52 and rotational member 54. The axle 52 extends between the first end plate 34 and the second end plate 36, generally extending across the roller cavity 37. The rotational member 54 comprises a cylindrical member which rotates within the roller cavity 37 about the axle 52. The rotational member includes first end 58 and second end 60 with an outer surface 56. The first end 58 corresponds to the first end plate 34 and the second end 60 corresponds to the second end plate 36.

In the configuration shown, the rotational member 54 comprises a substantially uniform cylindrical member having a diameter such that the outer surface 56 extends beyond both the front facing opening 38 and the upper facing opening 40. In the configuration shown, the outer surface 56 of the rotational member may include a surface treatment so as to be resilient, tacky, slippery or having another desired surface configuration. In the configuration contemplated, the rotational member may have a diameter that is 6 inches, while both smaller and larger diameters are contemplated. In addition, it is contemplated that the roller may have a length of 32 inches, 24 inches or 18 inches, while both longer and shorter (as well as length between the foregoing) are contemplated, without limitation.

Additionally, it is contemplated that while the rotational member 54 is shown as being a single substantially uniform cylinder, it is contemplated that the cylinder may be other than uniform (i.e., with variations in the diameter thereof). Additionally, it is contemplated that in the place of a single cylinder, it is contemplated that any number of different rotational structures may extend between the first and second end plats 34, 36.

To utilize the patient rotation device in a configuration wherein a patient slider device is utilized, and with reference to FIGS. 1 through 6, first, a patient slider device 100 is provided. Once provided, the patient rotation device 10 is attached to the patient slider device 100. In particular, in the configuration shown, the second end of the armature 12 is attached to the elongated body 122, so that the armature generally aligns with the height of the bed upon which the patient is positioned.

It will be understood that in other configurations, it may be desirable to have the patient slider device raised higher or lower than the surface of the bed, or desirable to alter the height during the movement of the bed (to, for example, achieve different movements. Furthermore, other placements and additional structures are contemplated to facilitate the stability of the patient during movement and/or rotation. It will further be understood that the device can be utilized without a patient slider device. For example, the patient rotation device may be directly coupled to a bed and the patient may be rotated by pulling of a sheet manually, without the further use of a patient slider device.

Once installed, the patient slider device 100 is oriented relative to the bed so that the rotational assembly overlies a portion of the bed to one side of the patient. As will be explained, the rotational assembly overlies the side of the bed that the patient will be rotated away from during operation.

Once positioned, the rotational member 54 is positioned proximate to the patient, and generally aligns with the patient in a side by side parallel orientation (of course, other orientations are contemplated, such as oblique or orientations where there is not a side by side relationship). Once positioned, the patient puling assembly 116 is employed. In particular, in the configuration shown, the winding strap 240 is extended from the housing and directly or indirectly attached to the sheet or other substrate underlying the patient. Such a coupling may be achieved through any number of different structures, many of which are shown in the incorporated patents and publications that are referenced above.

Once attached, the winch is activated, retracting the winding strap 240 back into the frame 112. As the winding strap 240 is retracted, the sheet is pulled over the rotational assembly and the patient is pulled closer and closer to the rotational assembly. Eventually, the patient reaches the rotational assembly, and as the sheet extends over the rotational assembly, the patient abuts the rotational assembly and is directed to roll in a direction away from the rotational assembly (i.e., in the opposite rotational direction from the direction of the rotational assembly).

The operator can stop the rotation at any moment that the desired level or rotation is reached by the patient. Once the desired rotation is reached, the operator can secure the patient, disconnect the winding strap from the sheet and move the device away from the bed.

If the operator desires to return the patient to the initial position, the patient rotation device and the patient slider device can be reoriented to the opposing side of the bed and the process can be repeated. In this scenario, the patient is rotated in the opposite direction, returning the patient to his or her initial position. Again, the patient can be secured (or confirmed to be in a safe and stable orientation), at which time the winding strap can be disconnected and returned to its original configuration. It is also contemplated that the patient may be able to be rotated into other positions, including the original orientation with the patient rotation device remaining on the same side throughout. Other variations are likewise contemplated.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A patient rotation device comprising:
- an armature structurally configured for attachment to an outside structure, the armature having a first end and a second end spaced apart from the first end;
- a patient engagement assembly including:
  - a housing attachable proximate the second end of the armature; and
  - a rotational assembly including an axle and a rotational member, the rotational member being rotationally coupled to one of the housing and the armature, and structurally configured to be being positionable over a surface of a bed.

2. The patient rotation device of claim 1 wherein the armature includes a bed abutment member positioned proximate the second end of the armature, the bed abutment structurally configured to abuttingly engage the side of the bed.

3. The patient rotation device of claim 1 wherein the housing of the patient engagement assembly further includes a base having a first end plate at a first side thereof, and a second end plate opposite the first end plate, the end plates positioned on either side of the armature, with the rotational member spanning therebetween.

4. The patient rotation device of claim 3 wherein the axle interfaces with the first end plate on a first side and the second end plate on a second side.

5. The patient rotation device of claim 3 wherein the base is structurally configured to be positionable on the bed.

6. The patient rotation device of claim 1 wherein the rotational member extends substantially perpendicularly relative to the armature, with the armature being positioned between the first and second ends thereof.

7. The patient rotation device of claim 1 wherein the rotational member comprises a cylindrical member having a diameter.

8. The patient rotation device of claim 7 wherein the diameter is approximately 6 inches.

9. The patient rotation device of claim 7 wherein the cylindrical member includes a substantially uniform configuration along the length thereof.

10. A combination patient slider device and patient rotation device wherein:

the patient slider device comprises a frame having a base and an elongated body extending therefrom, and, a patient pulling assembly comprising a winding strap structurally configured to be attachable to a bed sheet positionable over a surface of a bed;

the patient rotation device comprising:

an armature attached to the patient slider device, the armature having a first end and a second end spaced apart from the first end;

a patient engagement assembly including:

a housing attachable proximate the second end of the armature; and a rotational assembly including an axle and a rotational member, the rotational member being rotationally coupled to one of the housing and the armature, and structurally configured to be being positionable over the surface of the bed.

11. The combination of claim 10 wherein the armature extends from the elongated body of the patient slider device.

12. The combination of claim 11 wherein the armature is substantially perpendicular to the elongated body.

13. The combination of claim 12 wherein the rotational member rotates about the axle, with the axle being perpendicular to the elongated body.

14. The combination of claim 13 wherein the elongated body is positionable so as to be substantially parallel to the surface of the bed.

15. A method of rotating a patient positioned on a surface of a bed, and having a sheet positioned between the surface of the bed and the patient, the method comprising the steps of:

providing a patient rotation device comprising:

an armature structurally configured for attachment to an outside structure, the armature having a first end and a second end spaced apart from the first end;

a patient engagement assembly including:

a housing attachable proximate the second end of the armature; and a rotational assembly including an axle and a rotational member, the rotational member being rotationally coupled to one of the housing and the armature, and structurally configured to be being positionable over a surface of a bed;

moving the rotational member of the patient rotation device so as to be positioned over the surface of the bed;

directing the sheet across the rotational member;

pulling the sheet across the rotational member until the patient reaches the rotational member;

rotatably engaging the rotational member with the patient through the sheet; and rotating the patient through continued pulling of the sheet over the rotational member.

16. The method of claim 15 wherein the patient is positioned so as to be substantially parallel to the rotational member.

17. The method of claim 15 further comprising the step of:

providing a patient slider device, wherein the patient rotation device is coupled to the patient slider device.

18. The method of claim 17 further comprising the steps of:

attaching a winching strap to the sheet, the patient slider device having the winching strap extending therefrom;

wherein the step of pulling further comprises the step of pulling the winching strap; and wherein the step of rotating comprises the continued pulling of the sheet by the winching strap.

* * * * *